United States Patent [19]

Mueller

[11] Patent Number: 4,564,671

[45] Date of Patent: Jan. 14, 1986

[54] CONTINUOUS PREPARATION OF POLYOXYBUTYLENE POLYOXYALKYLENE GLYCOLS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 681,546

[22] Filed: Dec. 14, 1984

[30] Foreign Application Priority Data

Dec. 21, 1983 [DE] Fed. Rep. of Germany ....... 3346136

[51] Int. Cl.⁴ ............................................ C08G 65/20
[52] U.S. Cl. .................................. 528/416; 528/417; 560/240; 568/617
[58] Field of Search ............... 528/416, 417; 560/240; 568/617, 618, 620

[56] References Cited

U.S. PATENT DOCUMENTS

| | | | |
|---|---|---|---|
| 4,127,513 | 11/1978 | Bellis | 528/413 |
| 4,189,566 | 2/1980 | Mueller et al. | 528/408 |
| 4,192,943 | 3/1980 | Robinson | 528/417 |
| 4,228,272 | 10/1980 | Del Pesco | 528/413 |
| 4,303,782 | 12/1981 | McHale et al. | 528/416 |

FOREIGN PATENT DOCUMENTS

| | | |
|---|---|---|
| 6107 | 9/1980 | European Pat. Off. . |
| 3112 | of 1982 | European Pat. Off. . |
| 854958 | 11/1960 | United Kingdom . |

OTHER PUBLICATIONS

Ullnann's Enzyklopädie der technischen chemie, 3rd ed. vol. IV, pp. 541–545.

*Primary Examiner*—Earl Nielsen
*Attorney, Agent, or Firm*—John H. Shurtleff

[57] ABSTRACT

Polyoxybutylene polyoxyalkylene glycols are prepared by copolymerization of tetrahydrofuran with a 1,2-alkylene oxide in the presence of a compound containing reactive hydrogen, by a continuous process in which the polymerization is carried out in a reactor over a fixed-bed clay catalyst and with recycling of the reaction mixture, and less than 30% by weight, based on the reaction mixture to be recycled, of a mixture of tetrahydrofuran, 1,2-alkylene oxide and a compound containing reactive hydrogen is added to the reaction mixture, which is recycled to the reactor after flowing through the latter.

8 Claims, No Drawings

CONTINUOUS PREPARATION OF POLYOXYBUTYLENE POLYOXYALKYLENE GLYCOLS

The present invention relates to a process for the continuous preparation of polyoxybutylene polyoxyalkylene glycols by copolymerization of tetrahydrofuran with 1,2-alkylene oxides over a clay catalyst.

British Pat. No. 854,958 describes a process for the copolymerization of tetrahydrofuran and 1,2-alkylene oxides, in which the polymerization is carried out in the presence of a compound containing reactive hydrogen and over a clay catalyst. This process gives, as by-products, relatively large amounts of low molecular weight products which predominantly consist of oligomeric cyclic ethers.

These undesirable oligomeric cyclic ethers are impurities and inert material, whose removal from the polymers necessitates, for example, an expensive depolymerization procedure (European Laid-Open Application No. 6107). However, even this method of treatment does not result in quantitative removal, which is desirable because the inert material has an adverse effect on the mechanical properties of the polyurethanes prepared from the copolymers. The oligomers may also exude at the surface of the finished products or can be dissolved away by solvents, with the result that the dimensional stability of the shaped articles is adversely affected. To avoid these disadvantages, U.S. Pat. No. 4,127,513 proposes using, as a catalyst, specially activated montmorillonite, which is produced by using a fairly high concentration of acid when activating the bleaching earth with acid, so that the exchangeable alkali metal and alkaline earth metal ions are virtually completely replaced by hydrogen. The disadvantages in this process are the high color number of the polymers, the relatively low polymerization rate and the fact that the product still contains from 5 to 6% by weight of oligomeric cyclic ethers.

Another proposed improvement for the copolymerization of alkylene oxides with tetrahydrofuran under the catalytic action of activated bleaching earth is described in U.S. Pat. No. 4,228,272. It envisages the use of bleaching earths having a particular specific pore volume, a defined catalyst surface area and a defined pore diameter. One method is said to give products having an improved color number, at a higher polymerization rate. However, their oligomer content, at about 4% by weight (cf. column 5, lines 14 and 15), is too high to enable the copolymers to be used for the preparation of polyurethanes which have to meet fairly high mechanical requirements.

As is known, all processes for the copolymerization of alkylene oxides with tetrahydrofuran in the presence of bleaching earths give high molecular weight copolymers which possess terminal hydroxyl groups and are contaminated by 3-4% by weight of macrocyclic polyethers without hydroxyl groups. These macrocyclic ethers are inert materials because they do not possess any hydroxyl groups which react with isocyanate groups. Since these cyclic oligomers are very readily soluble in the conventional solvents, they can give rise to difficulties during processing. They have an adverse effect on the mechanical properties of the finished products.

It is an object of the present invention to provide a process for the preparation of high quality copolymers from tetrahydrofuran and 1,2-alkylene oxides, in which the formation of marked amounts of cyclic ethers is avoided.

We have found that this object is achieved if, in the continuous preparation of polyoxybutylene polyoxyalkylene glycols by copolymerization of tetrahydrofuran with a 1,2-alkylene oxide in the presence of a compound containing reactive hydrogen, where the polymerization is carried out in a reactor over a fixed-bed clay catalyst and with recycling of the reaction mixture, less than 30, preferably less than 20,% by weight, based on the reaction mixture to be recycled, of a mixture of tetrahydrofuran, 1,2-alkylene oxide and a compound containing reactive hydrogen is added to the reaction mixture, which is recycled to the reactor after flowing through the latter.

Suitable 1,2-alkylene oxides are unsubstituted or substituted alkylene oxides, examples of substituents being linear or branched alkylene of 1 to 6, preferably 1 or 2, carbon atoms, phenyl which is unsubstituted or substituted by alkyl and/or alkoxy groups of 1 or 2 carbon atoms or by halogen, or halogen, preferably chlorine. Examples of particularly suitable 1,2-alkylene oxides are 1,2-butylene oxide, 2,3-butylene oxide, styrene oxide, epichlorohydrin and, preferably, ethylene oxide and 1,2-propylene oxide. The 1,2-alkylene oxides can be used individually or in the form of mixtures, for example a mixture of ethylene oxide and 1,2-propylene oxide.

Examples of compounds containing reactive hydrogen are water, monohydric and polyhydric alcohols, such as methanol, ethanol, propanol, ethylene glycol, butylene glycol, glycerol, neopentylglycol or butanediol, and in particular carboxylic acids of, for example, 1 to 8, preferably 1 to 3, carbon atoms. Water and carboxylic acids, such as formic acid, acetic acid or propionic acid, are particularly suitable because, when they are used, scarcely any oligomeric cyclic ethers are formed, even at relatively high polymerization temperatures of, for example, from 35° to 50° C. The use of water and of polyhydric alcohols results in the free polyoxybutylene polyoxyalkylene glycols. If, on the other hand, carboxylic acids or monohydric alcohols are used as the compounds containing reactive hydrogen, the corresponding half esters or half ethers of the polyoxybutylene polyoxyalkylene glycols are formed.

Examples of suitable reactors are column-like reaction vessels which have any desired cross-section, for example square or elliptical. Advantageously, elongated cylindrical reaction vessels are used. The ratio of the internal diameter to the length of the reaction vessel is in general from 1:2 to 1:100, preferably from 1:10 to 1:40. The reactors can be vertical or horizontal, and may also assume an intermediate position. However, when the heat of reaction in the reaction vessel is to be conducted away, it is preferable to use, as the reactor, a vertical tubular furnace in which the tube diameter is about 10 - 100 mm. If the temperature is controlled by means of a heat exchanger incorporated in the external cycle, the reactor used can furthermore be a shaft furnace.

The bleaching earths used as catalysts are described in, for example, Ullmann's Enzyklopädie der technischen Chemie, 3rd edition, vol. IV, pages 541-545. These are natural or synthetic bleaching earths, such as aluminum hydrosilicates or aluminum magnesium hydrosilicates of the montmorillonite type, which can be activated by acid and are obtainable commercially, for example, under the name Tonsil ®. Synthetic bleaching earths are described in, for example, British Pat. No. 854,958. Depending on their preparation, bleaching earths contain various amounts of water from about 2 to 7% by weight. When they are dried at above 100° C., the bleaching earths lose the adsorbed water but, because they are hygroscopic, they take it up once again in the air. Particularly advantageous results are obtained with clay catalysts whose water content is less than 1, in particular less than 0.5, % by weight.

To prepare the fixed-bed clay catalysts, for example, the following procedure is adopted: the commercial water-containing bleaching earths are kneaded, for example with a binder, in particular with water, and the mixture is pressed to give moldings. The water-containing moldings are then dried at above 100° C., preferably at from 150° to 700° C., under atmospheric or reduced pressure, in the presence or absence of a gas which is inert under the reaction conditions, for example a noble gas, such as helium or argon, or in particular nitrogen. The water content of the catalyst moldings is then less than 1% by weight, and is preferably reduced to less than 0.5% by weight.

The bleaching earth moldings can be in the form of, for example, spheres, rings, cylinders or tablets. Where spherical bleaching earth moldings are used, the spheres generally have a diameter of from 2 to 15, preferably from 3 to 5, mm. The cylindrical moldings used generally have a length of from 2 to 15 mm and a diameter of from 2 to 6 mm. Non-spherical and non-cylindrical moldings generally have a volume corresponding to that of the cylindrical moldings.

The catalyst moldings are arranged in the reactor in the form of a fixed bed, for example simply by pouring them on. The catalyst bed through which the reaction mixture flows need not be replaced even after prolonged operation, since the catalyst moldings retain their initial solid form and do not suffer any abrasion. The catalysts also exhibit little loss of activity and have a long life.

The monomeric starting materials, tetrahydrofuran and 1,2-alkylene oxides, are advantageously used in very pure form. This ensures that the clay catalysts have a long life. For purification purposes, the tetrahydrofuran is pretreated before the polymerization with a strong mineral acid, an organic sulfonic acid, silica gel and, preferably, a bleaching earth, using the method described in European Laid-Open Application No. 3112.

The molar ratio in which the tetrahydrofuran and alkylene oxide monomers are reacted can be varied within wide limits. In advantageous monomer mixtures, the molar ratio of tetrahydrofuran to alkylene oxide is from 20:1 to 1:20, preferably from 10:1 to 1:10, in particular from 10:1 to 1:5. The concentration of the compound containing active hydrogen in the starting mixture is generally from 0.5 to 15, preferably from 1 to 10, mol %.

The copolymerization is carried out in the fixed catalyst bed at from 0° to 50° C., preferably from 20° to 45° C., under atmospheric pressure. Copolymerization mixtures containing a high proportion of ethylene oxide are advantageously copolymerized under superatmospheric pressure. At these reaction temperatures, the preferred residence time over the catalyst is from 0.5 to 4 hours.

In the novel process, in order to carry out the copolymerization, the mixture of the starting materials is passed through the reactor, the reaction mixture leaving the reactor being recycled once again through the reactor. Before the reaction mixture is passed once again into the reactor, it is mixed with less than 30, preferably less than 20,% by weight, based on the reaction mixture to be recycled, of fresh mixture of the monomeric starting materials. While the compound containing reactive hydrogen is always virtually completely converted, excess unreacted alkylene oxide or tetrahydrofuran remains in the reaction mixture.

Since the copolymerization is exothermic, the temperature is kept constant by cooling the reactor or the stream of reaction mixture which is circulated outside the reactor. From the reaction mixture leaving the reactor, a bleed stream is removed continuously at the rate at which fresh starting mixture is fed to the reactor. This bleed stream which contains the product is substantially free of 1,2-alkylene oxide or tetrahydrofuran, and of compounds containing reactive hydrogen. It consists of, for example, a mixture of from 30 to 60% by weight of copolymer and from 40 to 70% by weight of tetrahydrofuran. The conversion is in general from 35 to 55%, based on tetrahydrofuran used. The excess tetrahydrofuran is separated off completely by distillation, if necessary under reduced pressure. The glycols remaining in the bottom can then be used directly for the preparation of polyurethane resins. Before being reacted with the isocyanates, the corresponding halfesters must be hydrolyzed to the glycols. The said halfesters can be used as lubricants, without further treatment.

The resulting products, in particular those having a molecular weight of from 300 to 5,000, are very useful for the preparation of polyurethanes or polyesters. They impart to the ready-prepared polymers good mechanical properties coupled with high stability at low temperatures and resistance to microbes and hydrolysis. Compared with polytetramethylene ether glycol, they possess a low solidification point and can therefore be processed predominantly in liquid form, without it being necessary to carry out expensive liquefaction or melting processes beforehand.

The novel process has the substantial advantages that virtually no by-products, in particular no cyclic oligomers, are formed during the copolymerization, and that the reaction leads to complete conversion of the 1,2-alkylene oxide and of the compound containing reactive hydrogen. The resulting copolymers possess an extremely low color number, which is very advantageous with regard to processing. The polymers possess, per molecule, 2 hydroxyl groups, one hydroxyl group and one ester group, or one hydroxyl group and one ether group. Surprisingly, particularly advantageous results are obtained when dry bleaching earth is used, although the polymerization can be carried out in the presence of water as a compound containing reactive hydrogen. The reaction rate decreases sharply when the bleaching earth used contains, for example, from 3 to 5% by weight of water, an effect which cannot be explained.

The novel process has the further advantage that the final reaction mixture, in which the copolymers are present in concentrations of from 40 to 60%, need only be freed from excess tetrahydrofuran in order to enable them to be put to their end use, for example the preparation of polyurethanes. The tetrahydrofuran, which is advantageously removed by distillation under reduced pressure, can be used again for the reaction, without a purification operation being necessary.

The Examples which follow illustrate the process according to the invention without restricting it. Parts are by weight, and parts by weight bear the same relation to parts by volume as that of the kilogram to the liter.

EXAMPLE 1

Commercial technical-grade tetrahydrofuran was purified as described in Example 1 of European Laid-Open Application 3112, and used for the copolymerization.

Bleaching earths commercially available from Süd-Chemie AG, Munich, under the name Tonsil Optimum FF ® were converted to extrudates having a diameter of from 2 to 3 mm and a mean length of 4 mm, and the extrudates were dried for 4 hours at 200° C.

The dried extrudates were introduced into a reaction tube which had a capacity of 1000 parts by volume and a ratio of diameter to length of about 5:70 and was provided with a thermostatted cooling jacket. The steady-state reaction conditions below were established in the reaction tube. A solution consisting of 48 parts of tetrahydrofuran and 52 parts of a copolymer obtained from 32 parts by weight of tetrahydrofuran and 20 parts by weight of propylene oxide was pumped out of the lower end of the reaction tube at a rate of 5,000 parts by weight per hour, fed via a heat exchanger, by means of which the temperature was brought to 35° C., and then once again fed into the reaction tube from above. Shortly before entering the reaction tube, the reaction mixture was mixed with 200 parts/hour of a fresh feed consisting of 80 parts of tetrahydrofuran, 20 parts of propylene oxide and 1.3 parts of water. A cooling medium was passed through the cooling jacket of the reaction tube, the temperature of the medium being kept at 33°-35° C. A lateral take-off was mounted at the lower end of the reaction tube and led to a siphon corresponding to the height of the filled reaction tube. Reaction mixture flowed out of this take-off at the rate at which fresh feed was introduced. The siphon was mounted at a height such that the reaction tube could be operated in the absence of an upper gas phase, i.e. completely filled with liquid. When the reaction mixture discharged through the take-off was freed from unconverted tetrahydrofuran by evaporation under atmospheric and reduced pressure, 108 parts/hour of a block copolymer were obtained which, according to $^1$H-NMR or $^{13}$C-NMR analysis, consisted of 32 parts of tetrahydrofuran and 20 parts of propylene oxide. The polyetherglycol contained 65% of primary hydroxyl groups and 35% of secondary hydroxyl groups and had a molecular weight of 990, calculated from the hydroxyl number. The color number was 10 APHA. Using a conventional method, it could be processed with isocyanates to give polyurethanes, or with dicarboxylic acids to give polyesters. As determined by distillation under reduced pressure of $10^{-7}$ mm Hg and at 200° C., the resulting copolymer contained less than 1% of volatile oligomeric cyclic ethers.

EXAMPLE 2

Example 1 was repeated, except that propylene oxide was replaced by an equimolecular amount of ethylene oxide. Complete conversion of the ethylene oxide took place, while 46% of the tetrahydrofuran was converted. The copolymer was free of cyclic oligomers and had a color number of 30 APHA.

EXAMPLE 3

Using a method similar to that described in Example 1, a monomer mixture consisting of 258 parts of tetrahydrofuran, 64 parts of propylene oxide and 23 parts of neopentylglycol was polymerized at 25° C. The residence time was not altered. Conversion of the propylene oxide was complete, while about 40% of the tetrahydrofuran used was incorporated in the polymer. The resulting polyetherglycol was free of oligomeric cyclic ethers and had a molecular weight of 980.

EXAMPLE 4

Using a method similar to that described in Example 1, a monomer mixture consisting of 266 parts of tetrahydrofuran, 67 parts of propylene oxide and 21 parts of butane-1,4-diol was polymerized. The propylene oxide was converted quantitatively to copolymer, while 52% by weight of the tetrahydrofuran used was incorporated in the polymer. The molecular weight of the polymeric polyetherglycol was 1,050, and the amount of cyclic oligomers was 2% by weight.

COMPARATIVE EXAMPLE (Repeated recycling of the reaction mixture with the addition of fresh propylene oxide, according to Example 1 of British Pat. No. 854,958.)

As described in Example 1 of British Pat. No. 854,958, steady-state reaction conditions were first established at 35° C. 5,000 parts by weight/hour of the reaction product, which consisted of a 52% strength by weight solution of the copolymer in tetrahydrofuran, were then circulated. The reaction cycle was equipped with an additional vessel having a capacity of 1,000 parts by volume. Propylene oxide was fed to the upper end of the reaction tube at a rate of 1,000 parts by weight/hour. After 2 hours, the initial reaction mixture was converted to a mixture which consisted of 60% by weight of polymer and 40% by weight of tetrahydrofuran. The polymer consisted of 32 parts by weight of tetrahydrofuran and 40 parts by weight of propylene oxide. Distillation under reduced pressure showed that 12% by weight of volatile oligomeric cyclic ethers had been formed.

EXAMPLE 5

As described in Example 1, a monomer mixture consisting of 577 parts of tetrahydrofuran, 60 parts of propylene oxide and 31 parts of acetic acid, and employed as fresh feed, was polymerized at 40° C. The propylene oxide was completely converted, while 45% of the tetrahydrofuran was converted. The polymer had an OH number of 45 mg of KOH/g and a hydrolysis number of 43 mg of KOH/g. This gave a molecular weight of 1,250.

The procedure was carried out as described above, except that in this case a monomer mixture consisting of 120 parts of tetrahydrofuran, 600 parts of propylene oxide and 38 parts of acetic acid was used as fresh feed. Polymerization at 25° C. gave a co-oligomer consisting of 60% by weight of propylene oxide and 40% by weight of tetrahydrofuran. The molecular weight was 900.

I claim:

1. A process for the continuous preparation of a polyoxybutlene polyoxyalkylene glycol or its half-esters or half-ethers by copolymerization of tetrahydrofuran with a 1,2-alkylene oxide in the presence of a compound containing reactive hydrogen, where the polymerization is carried out in a reactor at below 50° C. over a fixed-bed clay catalyst and with recycling of the reaction mixture, wherein less than 30% by weight, based on the reaction mixture to be recycled, of a mixture of tetrahydrofuran, 1,2-alkylene oxide and a compound containing reactive hydrogen is added to the reaction mixture, which is recycled to the reactor after flowing through the latter.

2. A process as claimed in claim 1, wherein the 1,2-alkylene oxide used is ethylene oxide or 1,2-propylene oxide or a mixture of these.

3. A process as claimed in claim 1, wherein the molar ratio of tetrahydrofuran to the 1,2-alkylene oxide in the monomer mixture fed to the polymerization is from 20:1 to 1:20.

4. A process as claimed in claim 1, wherein the copolymerization is carried out at from 0° to 50° C. and under atmospheric pressure.

5. A process as claimed in claim 1, wherein the copolymerization is carried out using a residence time over the catalyst of from 0.5 to 4 hours.

6. A process as claimed in claim 1, wherein water is used as the compound containing reactive hydrogen.

7. A process as claimed in claim 1, wherein a carboxylic acid is used as the compound containing reactive hydrogen.

8. A process as claimed in claim 1, wherein a clay catalyst containing less than 1% by weight of water is used.

* * * * *